Figure 1:
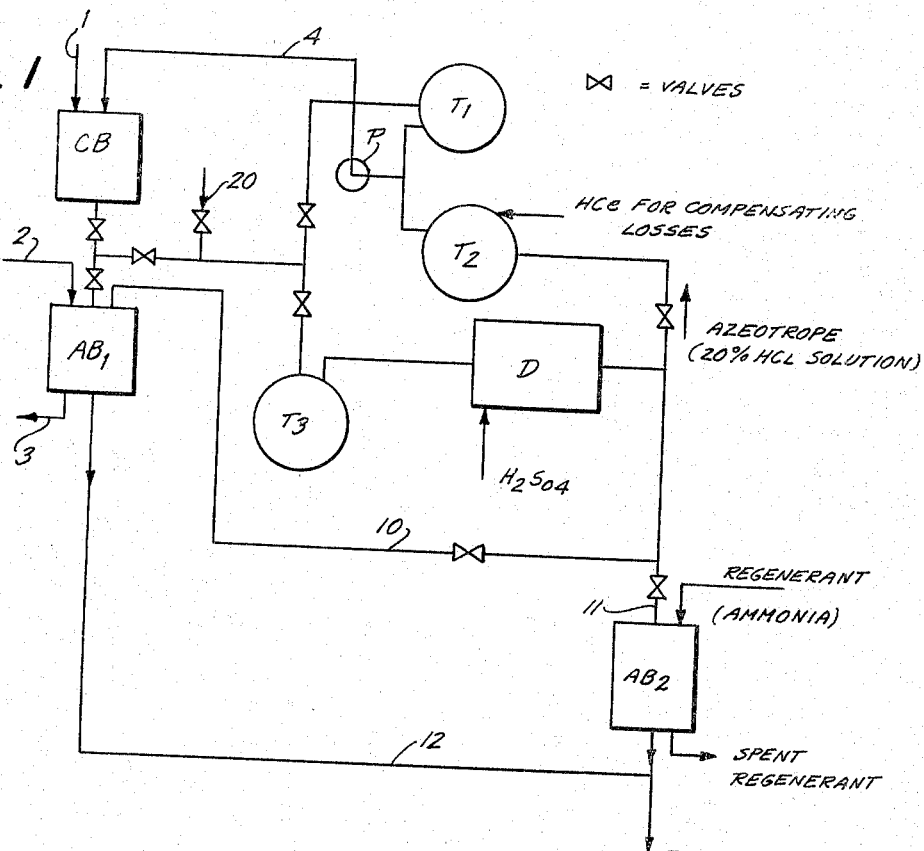

April 25, 1967 — N. MASTRORILLI — 3,316,171
PROCESS FOR REGENERATING CATIONIC RESINS
Filed Aug. 26, 1963

INVENTOR.
Nunzio Mastrorilli
BY
Michael S. Striker

United States Patent Office 3,316,171
Patented Apr. 25, 1967

3,316,171
PROCESS FOR REGENERATING CATIONIC RESINS
Nunzio Mastrorilli, Piazza Risorgimento 10, Milan, Italy
Filed Aug. 26, 1963, Ser. No. 304,392
Claims priority, application Italy, Aug. 25, 1962, 16,873/62
17 Claims. (Cl. 210—34)

The present invention relates to a process of regenerating cationic exchange resins and, more particularly, the present invention is concerned with a process for regenerating, in a hydrogen cycle, cationic resins used in water treatment plants.

Conventionally, cationic type exchange resins comprising copolymers of styrene sulfonates and divinyl benzene are used in water treatment plants. Products of this type are commercially available under the trade names Amberlite IR-120, Amberlite 200, Dowex 50, Nalcite HCR, Nalcite HCR-W, Lewatit S100, Zerolit 225, Kastel C300 and Relite CFS. These more or less similar cationic exchange resins used for water treatment are then regenerated in an acid cycle in which mainly hydrochloric or sulfuric acid are used and the acid is employed in excess of the stoichiometrically required amount in order to achieve a satisfactory regeneration of the exchange resin.

Technical and economic factors determine which of these regenerating agents should be used.

Sulfuric acid has the advantage of lower price, weight for weight, as compared with the cost of hydrochloric acid. However, certain disadvantages are connected with the use of sulfuric acid as the regenerating agent.

The most important disadvantage is found in the fact that sulfuric acid must be used in very dilute form, for instance, as a 2% aqueous solution or slightly more concentrated, when bivalent ions, such as calcium, are to be removed from the exchange resin. This low concentration of sulfuric acid is required in order to avoid precipitation of insoluble calcium sulfate and the danger of choking the exchange bed. In other words, if precipitated calcium sulfate is retained in the mass of exchange resin, the capacity of the resin is greatly reduced.

However, such low concentration of the sulfuric acid precludes an ecomonic recovery of the excess acid. Furthermore, considerable quantities of water must be available for the washing of the resin after sulfuric acid regeneration, such as 150 gallons of water per cubic foot of resin.

The efficiency of the sulfuric acid as a regenerating agent is rather low and this acid behaves mainly like a monobasic acid with respect to the removal of bivalent cations from the exchange resin. This behavior of sulfuric acid as regenerating agent is described in the manual, "Amberlite Ion Exchange Resins," Rohn & Haas Co., Engineering Data on Amberlite IR-120-Hydrogen Cycle. Furthermore, sulfuric acid solutions must be used at room temperature since elevated temperatures increase the tendency to calcium sulfate precipitation and, consequently, it is not possible to properly exploit the exothermic nature of the process.

These are serious disadvantages connected with the use of sulfuric acid as regenerating agent. On the other hand, however, regeneration with sulfuric acid is possible at lower costs as compared with the use of hydrochloric acid and permits some simplification of the plant with respect to reservoirs, water conduits and the like.

Considering now the use of hydrochloric acid, it is apparent that the above described main disadvantage of the sulfuric acid process, namely the choking of the exchange resin with precipitated salts, will not occur due to the solubility of the chlorides formed during the regeneration process.

However, the costs of regeneration are greatly increased by using hydrochloric acid and, furthermore, no provision is made in industrial practice for the recovery of excess acid except, with certain restrictions, by recycling the regenerating solution. This, however, does not permit complete utilization of the free acid.

Thus, since in the actual treatment of water, containing, inter alia, also bivalent cations, the regenerating sulfuric acid acts with respect to the latter mainly as if it were a monobasic acid, it is generally preferred to use hydrochloric acid provided that the costs of hydrochloric acid on a 100% acid basis do not exceed 2.5 or up to 2.7 times the cost of sulfuric acid.

It is an object of the present invention to provide a process of regenerating cationic exchange resins, particularly in the water treatment art which is not subject to the above discussed difficulties and disadvantages.

It is a further object of the present invention to provide a process of regenerating cationic exchange resins used for the removal of cations from water which can be carried out in a simple, effective and economical manner.

Other objects and advantages of the present invention will become apparent from a further reading of the description and of the appended claims.

With the above and other objects in view, the present invention contemplates a process for regenerating cationic exchange resins, comprising the steps of treating an at least partially spent cationic exchange resin with a solution containing a monobasic acid so as to regenerate the cationic exchange resin and to form a solution containing at least one salt of the monobasic acid, and contacting the thus formed solution with a polybasic acid of greater strength and lesser volatility than the monobasic acid so as to react the polybasic acid and the salt of the monobasic acid, thereby freeing the monobasic acid under formation of a salt of the polybasic acid.

According to a preferred manner of carrying out the present invention, the same contemplates in a water treatment process employing cationic exchange resins for removing cations from water to be treated, the steps of treating an at least partially spent cationic exchange resin containing cations removed from water with a solution containing a monobasic acid selected from the group consisting of hydrochloric acid, hydrobromic acid, nitric acid, nitrous acid, acetic acid and propionic acid so as to regenerate the cationic exchange resin and to form a solution containing the salt of the monobasic acid and the cations, contacting the thus formed solution with a polybasic acid of greater strength and lesser volatility than the monobasic acid and selected from the group consisting of sulfuric acid, pyrosulfuric acid, chromic acid, phosphoric acid and oxygenated acids and acid salts of phosphorus at a temperature at which the monobasic acid will be volatilized while the polybasic acid will remain substantially unaffected so as to react the polybasic acid and the salt of the monobasic acid under formation of a salt of the polybasic acid and of the free monobasic acid and to substantially volatilize the thus formed free monobasic acid, recovering the thus volatilized monobasic acid, and treating subsequent portions of at least partially spent cationic exchange resin with the thus recovered monobasic acid.

The prior art difficulties encountered in regenerating the cation exchange resin either with a polybasic acid such as sulfuric acid, or with a monobasic acid such as hydrochloric acid, are overcome according to the present invention which makes it possible to utilize sulfuric acid in such a manner that the sulfuric acid will react as a dibasic acid and thus only approximately half of the previously required amount of sulfuric acid will be needed. Furthermore, according to the present invention, it is possible to use only the stoichiometrically required amount of sulfuric acid or a slightly larger amount.

In a certain sense, regeneration of the resin is carried out according to the present invention so that the advantages of a technical nature which are connected with the use of hydrochloric acid or of another monobasic acid, are combined with the advantages of a more economic nature which are derived from the use of a polyvalent or dibasic acid, such as sulfuric acid, which acid, furthermore, is fully utilized and, in addition, the amounts of acid used may be reduced to stoichiometric amounts or amounts not greatly exceeding the same.

Thus, cationic resins, primarily those used in plants for softening water which is rich in bivalent cations, are regenerated according to the present invention by using two acids of different characteristics and costs. According to the present process, the monobasic acid, which is the more expensive one, will be recovered and completely recycled (except for inevitable losses of an industrial process). The monobasic acid is used for direct regeneration of the resin, while the less expensive dibasic acid, which will not be recovered, is used for regenerating the spent monobasic acid and in this acid recovery process, the dibasic nature of the sulfuric acid or the like will be fully utilized. However, the dibasic acid will not come in direct contact with the exchange resin.

Thus, according to the present invention, the spent or partially spent cationic exchange resin is regenerated by contact with a monobasic acid and thereafter the solution which initially was a solution of monobasic acid and now includes salts of the monobasic acid, is distilled with a polybasic acid.

In order to be operative, the process of the present invention requires that the polybasic acid be of sufficient strength to displace or free the monobasic acid from its salts, and that the volatility of the monobasic acid be greater than that of the polybasic acid.

Thus, the terms "less volatile" and "stronger" are used herein in a relative sense to distinguish the polybasic acid with respect to the analogous qualities of the monobasic acid used in the same process.

Volatile monovalent acids which give good results in the process of the present invention include hydrochloric acid, hydrobromic acid, nitric acid, nitrous acid, acetic acid and propionic acid. Less volatile but stronger polybasic acids which may be advantageously used include sulfuric acid, pyrosulfuric acid, chromic acid, phosphoric acid and oxygenated acids and acid salts of phosphorus, such as phosphorus acid, hydrophosphoric acid and its salts of the type $X_2H_2P_2O_6$, phosphoric acid and its salts of the type $XH_2PO_4$, pyrophosphoric acid and its salts of the type $X_2H_2P_2O_7$, monoperphosphoric acid and diperphosphoric acid and their acid salts. In the formulas hereinabove X indicates a monovalent cation.

With respect to the required relationship of strength and volatility between the monobasic and polybasic acids, good results are obtained with the combinations shown in Table I.

*Table I*

(1) Hydrochloric acid ------- Sulfuric acid, phosphoric acid, chromic acid.
(2) Hydrobromic acid ------- Phosphoric acid, chromic acid.
(3) Nitric and nitrous acids --- Sulfuric acid, phosphoric acid, chromic acid.
(4) Acetic acid ------------- Sulfuric acid, phosphoric acid.
(5) Propionic acid ---------- Do.

The process of the present invention, utilizing hydrochloric acid and sulfuric acid for the removal of bivalent cations from the exchange resin can be schematically illustrated by the following equations:

(1) $\quad XR_2 + 2HCl = 2HR + XCl_2$
(2) $\quad XCl_2 + H_2SO_4 = 2HCl + XSO_4$ wherein X represents a bivalent cation and R a monovalent radical of the resin.

The amount of volatile monobasic acid which is used for the regeneration of the exchange resin may vary within wide limits. For example, if Q represents in gram equivalents the stoichiometric amounts of acid required for regeneration of the resin, between 0.5 Q and 500 Q of the monobasic acid may be advantageously used.

The use of larger amounts of the monobasic acid, for instance in the vicinity of 500 Q, is sometimes justified by the fact that the exchange power of the resin increases, although not proportionately, with an increase in the amount of hydrochloric acid used in the regeneration process. Since the entire monobasic acid is recovered by distillation, the excess acid employed affects only the costs of the distillation process. Therefore, the amount of hydrochloric acid employed should be as high as possible in order to obtain a high exchange power of the resin, but not so high as to render the distillation costs excessive. With "exchange power" or capacity is meant the amount of salt, i.e., cations taken up per unit of volume of the exchange resin mass.

The concentration of the volatile and relatively weak monobasic acid used in the regeneration process, for instance, weight of hydrochloric acid per volume of regeneration solution, can be increased up to the saturation or maximum solubility concentration of the acid in water which prevails under the conditions of use of the regenerating solution, in order to increase the effectiveness of the regeneration, the regenerative level of the resin (as represented by the quantity by weight of regenerating acid per unit volume of the resin) and also to reduce the quantity of effluent which is to be subjected subsequently to distillation. In practice, it is preferred to maintain the concentration of the volatile monobasic acid between a maximum value represented by a fully saturated aqueous solution of the monobasic acid and a minimum value represented by an aqueous solution containing about 1% of the monobasic acid such as hydrochloric acid.

The stronger and less volatile polybasic acid may be used, according to the present invention, in amounts or proportions which encompass a range from a minimum value which is below the stoichiometric amount indicated by Equation 2 and a maximum value which is above the stoichiometric amount corresponding to the entire amount of volatile monobasic acid used, and partly or wholly converted to salt, during the regeneration of the resin. In other words, if $P_1$ represents in gram equivalents the stoichiometric quantity of non-volatile polyvalent acid according to the fraction of the volatile monobasic acid which has been converted to salt during regeneration, and $P_2$ represents in gram equivalents the stochiometric amount of the non-volatile acid corresponding to the fraction of the volatile acid which is not converted to salt during the regeneration, while P represents in gram equivalents the total stoichiometric quantity of the volatile acid, the limits of use for the less volatile stronger acid lie between $0.1P_1$ and $5(P_1+P_2)=5P$.

However, maintenance of these limits, while preferred, is not absolutely necessary. Quantities above the maximum indicated amount are employable in cases where the heat energy required for the distillation step is expensive and where it is therefore desired to make better use of the exothermic nature of diluting sulfuric acid with aqueous liquids. Lower amounts are employed with lower amounts of monobasic acid such as hydrochloric acid. In most cases, the preferred values for the polybasic acid are those slightly exceeding the stoichiometric value indicated as $P_1$.

The polyvalent, stronger and less volatile acid may be used in any concentration between that of oleum in the case of sulfuric acid and a concentration of 1% of the acid in an aqueous solution. Thus, for example, it is possible, according to the present invention, when using sulfuric acid as the dibasic or polyvalent acid and under otherwise equal conditions, to achieve the acid regeneration of a resin including the removal of bivalent ions therefrom by using a quantity of sulfuric acid far below the quantity required according to prior art methods. Furthermore, according to the present invention, a volatile monovalent acid, for instance hydrochloric acid, may be utilized in much greater quantities than could be used, for economic reasons, in prior art processes of this kind. The use of these larger quantities of monovalent volatile acid raises the exchange capacity of the resin and thus, conditions being equal, it is possible to obtain the desired result in a smaller plant, i.e., by improving the exchange capacity and proportionately reducing the amount of resin. This, again, results in a reduced capital investment.

The process of the present invention can also be carried out with acids of relatively low purity, i.e., acids containing impurities such as technical acids and recovered acids. Particularly, it is possible to carry out the present process with hydrochloric and sulfuric acids which may contain, for instance, chlorine, arsenic, organic substances, iron and salts of other metals. The use of such impure acids is possible since the sulfuric acid will not contact the resin and the hydrochloric acid or other volatile monovalent acid will be purified during distillation or volatilization of the same in the presence of sulfuric acid or the like.

According to one modification of the process of the present invention, a fraction of the distillate, and in general, the first fraction of the distillate which consists mainly of water containing a trace of hydrochloric acid, can be conveniently used for washing anionic resins in plants which operate with cationic and anionic resins. This fraction of the distillate obtained by volatilization of the monovalent acid in the presence of the stronger polyvalent acid can thus be used for washing anionic resins, replacing the decationized water otherwise obtainable by passing raw water through cationic resins. To proceed in this manner, namely, using a fraction of the distillate for the washing of anionic resins will thus reduce the amount of liquid which is to be passed through the cationic stages and thereby the plant capacity will be increased or the plant size may be reduced.

An additional advantage of the process of the present invention is realized in cases where the raw water which is to be treated is rich in chlorides. By carrying out regeneration with hydrochloric acid diluted with raw water, a larger amount of chlorides in the diluting water will result in a higher concentration of salts of the type $X^nCl_n$ (wherein $n$ denotes the valency of the cation X and the number of atoms of chlorine) in the spent regenerator. This, again, will result in a higher concentration of hydrochloric acid in the liquid being returned for recycling in the regenerator and this is achieved at the expense of sulfuric acid which is fully utilized in freeing hydrochloric acid and thus is used at about twice the reactivity which sulfuric acid has when contacting the resin directly.

According to another modification of the present invention, the distillate fractions of lower hydrochloric acid content may be used to produce demineralized water in exchange on anionic resins. In this manner an economic conversion of salt water, such as sea water, to fresh water can be obtained. For this purpose, it suffices to add to the regenerating solutions more or less large quantities of, for instance, sea water and to collect the first fractions of the distillate which are less rich in hydrochloric acid. These fractions are then passed through an anionic bed, at the downstream end of which the desired fresh water is obtained. The thus obtained fresh water may be added to fresh water obtained by passage of salt water through the cationic bed and another anionic bed.

In accordance with the foregoing, fresh water may be produced from sea water or the like, for instance, in the following manner:

(a) The sea water is led through a cationic bed and an anionic bed;

(b) The once exhausted cationic bed is regenerated with a hydrochloric acid solution;

(c) The desired quantity of sea water is added to the regenerator upstream or downstream with respect to the cationic bed;

(d) The mass comprising exhausted regenerator and sea water is distilled with sulfuric acid;

(e) The first fractions of distillate which are weaker in HCl are collected and led through a separate anionic bed distinct from that indicated in (a), while the azeotrope is used for the subsequent regeneration of the cationic bed;

(f) The fractions deacidified via the anionic bed are added to the fresh water obtained in phase (a).

The procedure here described applies whether the regeneration is effected in parallel flow or countercurrent flow in the same exchangers as those which go to make up the demineralization plant, whether the regeneration is effected with provisions for removal of spent from the filters and for treatment of the resin itself with regenerating acid in another vessel, where if suitable, after regeneration, recovery of regenerated resin and of regenerating agent is effected by means which do not involve dilution of the regenerator itself (filtration, centrifuging, flotation, etc.).

The process proposed furthermore involves, due to the possibility of using regenerating acid solutions at high concentration, also removing ions from the resins which are otherwise difficult to remove, as is particularly the case with ferric or aluminum ions.

Unavoidably, some small portion of the monovalent acid, such as hydrochloric acid, will be lost during the process which, in the nature of a technical process, does not operate with 100% efficiency. It is further proposed, according to the present invention, to provide the hydrochloric acid needed for regenerating the resin and/or for compensating losses, by adding sodium chloride of which during the distillation with sulfuric acid hydrochloric acid will be produced. To proceed in this manner appears to be more economical than to introduce hydrochloric acid from an outside source into the process. Thus, for example, before starting the regenerating process, sodium chloride may be distilled with sulfuric acid and the resulting condensation product, i.e., an aqueous solution of hydrochloric acid, will then be used for regenerating the resin; while the hydrochloric acid losses are compenated by introducing into the distillation step sodium chloride in quantities corresponding to the loss of hydrochloric acid.

Figure 2:
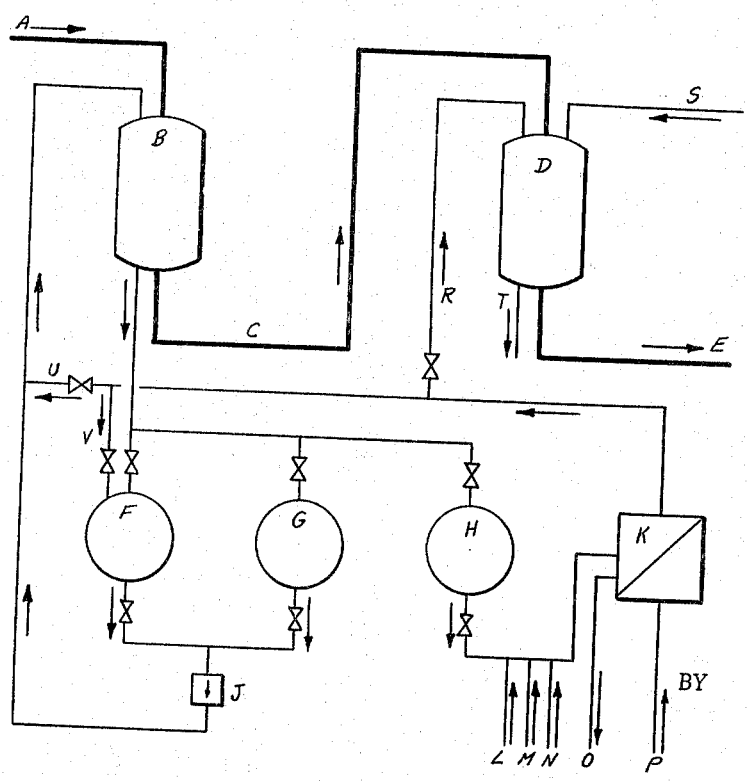

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1 and 2 are schematic representations of arrangements for carrying out the present invention.

Referring first to the arrangement of FIG. 1, it will be noted that the plant schematically illustrated therein has only one demineralizing line. However, it will be understood that without difficulties a further line can be arranged in parallel to the shown in FIG. 1 and as required for the processess described in some of the examples.

When the plant illustrated in FIG. 1 is to be used for the demineralization of raw water (not sea water), the raw water enters into the cationic stage CB through conduit 1 and then flows through the anionic stage AB. When the resins of the two stages are exhausted, the anionic resin is regenerated with ammonia which flows from pipe 2, enters the anionic stage $AB_1$, and is withdrawn through pipe 3. The cationic resin is regenerated with a solution of hydrochloric acid in water which is applied to CB through pipe 4 by means of pump P. Pump P draws the hydrochloric acid solution from two tanks $T_1$ and $T_2$. The second fraction of the regenerant is collected in tank $T_1$. This fraction is contaminated with $X^nCl_n$ salt (X=cation) in a lesser amount than the first fraction which is collected in tank $T_3$ and which therefore is passed to distillation with sulfuric acid in the distiller and condenser D. Tank $T_2$ contains the azeotrope (HCl plus water) which is the product of the distillation and will serve for compensating additional losses of hydrochloric acid.

The first fraction of the distillate may be conveyed through pipe 10 to the anionic stage for washing the anionic resin contained therein.

The distillate fractions of lower hydrochloric acid content may be conveyed through pipe 11 to separate anionic stage $AB_2$ downstream of which fresh (demineralized) water is obtained and this water may be combined with the demineralized water derived from stage $AB_1$ via pipe 12 and conveyed, for instance, to storage facilities (not shown).

More particularly, to obtain demineralized water from sea water as the raw water, sea water is led through the cationic bed CB and the anionic bed $AB_1$. Upon exhaustion of cationic bed CB the same is regenerated with a hydrochloric acid solution as described above. A desired quantity of sea water is added to the spent regenerator through pipe 20. The thus formed mixed liquid is passed into tank $T_3$ and from there is to the distilling arrangement D for distillation with sulfuric acid. The first fractions of the distillate formed in D which are of relatively low HCl content are led through anionic bed $AB_2$, while the azeotrope is collected in $T_2$ for subsequent use in the regeneration of the cationic bed. The fractions which are deacidified by passage through anionic bed $AB_2$ are added to the fresh water obtained by passing sea water through CB and $AB_1$.

The following examples are given as illustrative only without limiting the invention to the specific details described therein.

EXAMPLE I

For purposes of comparison, there will be first described in the present Example the conventional process of demineralizing raw water of high salt content and thereafter demineralization of such water in accordance with the process of the present invention will be set forth.

A. *Conventional Process.*—Raw water of high salt content is demineralized in a conventional plant capable of producing in continuous operation 100 m.³/h. of demineralized water for feeding high pressure boilers.

The plant comprises two demineralization lines, each having a capacity of 100 m.³/h. Each line is producing demineralized water for 4 hours and thereafter is regenerated. Thus, each line produces 400 m.³ of demineralized water between two successive regenerations of the line. The two lines operate alternately so that one line is regenerated while the other produces demineralized water.

The characteristics of the raw water were such as to make the cationic load 950 kg. of calcium carbonate per cycle. From the tables made available to the users of the resin (Amberlite IR–120) employed in the process, which tables give data concerning the behavior of this cationic resin, the following values are found to apply to the case under consideration, allowing for suitable safety margins:

(a) Regeneration with HCl.
Regenerative level: 50 gram HCl per liter of resin.
Concentration: 6%.
Exchange capacity: 40 kg. $CaCO_3$ per m.³ of resin.

(b) Regeneration with $H_2SO_4$.
Regenerative level: 160 gram $H_2SO_4$ per liter of resin.
Concentration: 3%.
Exchange capacity: 40 kg. $CaCO_3$ per m.³ of resin.

The amount of cationic resin then comes to be equal to almost 25 m.³ per plant line (theoretically it should have been 23.8 m.³).

Thus, the regeneration by the traditional method of all the resin present in the demineralization plant requires for 800 m.³ of water produced:

(A) Using HCl.
50 kg. HCl/m.³ of resin×50 m.³ of resin=2500 kg. 100% HCl.

(B) Using $H_2SO_4$.
160 kg. $H_2SO_4$/m.³ of resin×50 m.³ of resin=8000 kg. $H_2SO_4$ 100%; for regeneration of each line either 1250 kg. 100% HCl or 4000 kg. 100% $H_2SO_4$ are required.

The plant comprises, besides the cationic stages, anionic stages (weak and strong) and mixed bed stages.

The regenerative levels of the cationic stages have been assumed to be such as to secure, on the downstream side of the cationic filters, a leakage of 20 p.p.m. $CaCO_3$.

B. *The process of the present invention* is carried out in a plant capable of producing continuously 100 m.³/h. of demineralized water. The plant includes two demineralization lines of the type illustrated in FIG. 1, each having an hourly capacity of 100 m.³ and the raw water treated according to this example is identical with that described above in connection with the conventional process.

The regeneration of the cationic stages or resins of each of the two lines of the demineralization plant is effected at a regenerative level of 100 gram HCl per liter of resin, i.e., at a value twice as high as that of the above described conventional process. For the regeneration of each line the equivalent of 2500 kg. of 100% HCl is used at a concentration of 21%. The hydrochloric acid solution required may be obtained by distilling 4000 kg. of sodium chloride with 6200 kg. of sulfuric acid in a suitable aqueous dilution.

The leakage of the thus regenerated cationic filters is reduced from 20 p.p.m. $CaCO_3$ to 5 p.p.m. $CaCO_3$ and, consequently, the time interval between two regenerations of the mixed bed filters is quadrupled.

The leakage is reduced for the following reason.

By increasing the regenerative level, i.e., the amount of hydrochloric acid per volume of resin, the capacity of the cationic resin for removing cations from the raw water is also increased. Consequently, downstream from the cationic resin only lesser amounts of impurities which form the leakage will be found. Tables are supplied by the manufacturer of the resin which indicate for each value of the regenerative level and in accordance with the characteristics of the water to be treated the corresponding leakage values.

It follows that the consumption of regenerating acid for producing an equal amount of water will be only one fourth of that described in the conventional process.

The higher value of 100 gram HCl per liter of resin as the regenerative level will cause an increase in the exchange capacity of the resin. From the tables supplied by the resin manufacturer, and again allowing for a suitable margin of safety, it is found that the exchange capacity of the resin is thus increased by more than 33% and will exceed a value of 55 kg. $CaCO_3$ per $m.^3$ of resin. Consequently, the dimensions of the cationic filters can be reduced by one third without reducing their capacity as compared with the conventional process. In addition, the wash water requirements of the cationic filters will be proportionately reduced by one third.

The effluent from the cationic filters is distilled with 12,000 kg. of 66° Be sulfuric acid, an amount of sulfuric acid which is more than sufficient to displace the highly chloric acid from the salts in the solution of the partly exhausted regenerator.

It should be noted that according to the first described conventional process, the regenerative effectiveness of the resin regenerated with hydrochloric acid exceeds 180% and that, consequently, only little more than half of the 1250 kg. of HCl are converted into salt, actually about five ninth of the 1250 kg.

Twice that amount of HCl is used in accordance with the present method and only somewhat less than one third, actually five-eighteenths of the initially introduced acid are converted into salt.

To explain the above mentioned regenerative effectiveness of more than 180% and referring to the data given in the present example, it should be considered that a resin capable of exchanging 40 gram $CaCO_3$ per liter must be regenerated with 50 grams HCl per liter. Since the amount of HCl which corresponds stoichiometrically to 40 gram $CaCO_3$ equals about 28 gram and since 50 g. HCl are effectively used, it is apparent that an excess of HCl equal to 80% is used, i.e., the amount of HCl used is 1.8 times or 180% of the theoretically required amount.

Distillation of the effluent is started under reduced pressure (50 mm. Hg) and proceeds at rising pressure under continued addition of sulfuric acid to atmospheric pressure, ending concommittantly with a rise in temperature in the distillation chamber with the evolution of gaseous HCl which is collected and dissolved in the liquid previously distilled and condensed. The distillation yield of highly chloric acid is appreciably over 80% of the theoretical yield.

Depending upon the efficiency of the distillation, an aqueous solution containing between 50 and 100 kg. of 100% HCl is added to the distillate, or an amount of between 80.5 and 161 kg. of sodium chloride is introduced into the distillation chamber. Each of these two measures will serve to compensate for hydrochloric acid losses.

The effective consumption of sulfuric acid amounts at most to 1200 kg. of concentrated acid, equal to about 1150 kg. of 100% acid and the actual consumption or loss of hydrochloric acid up to a maximum of the equivalent of 100 kg. of 100% HCl.

Depending on the cost of thermal energy as compared with the cost of hydrochloric acid, the amount of heat furnished for the distillation process may be varied so as to reduce or increase the recovery, make-up or reintegration of HCl. The distillation may also be carried out in such a manner that all of the HCl will be expelled, for instance, by admitting into the still a current of air or other gas whose only function is to serve as a means of expelling HCl.

It has been shown how the process of the present invention will permit reduction of the quantity of cationic resin by one-third due to an increase in the regenerative level of the resin. In an entirely analogous manner it is also possible to increase the exchange capacity of the cationic resin in a mixed bed, using for its regeneration part of the acid intended for distillation. The regeneration of cationic filters capable of producing 400 $m.^3$ of demineralized water under the conditions described above will result in a saving of approximately 70% of sulfuric acid, namely, on a basis of 100% sulfuric acid in a reduction of the required amount from 4000 kg. to 1150 kg.

Certain savings are also obtained with mixed beds. However, although these savings contribute to making the process of the invention more economical, they are of relatively smaller importance.

In the description of the conventional process, low values of the regenerative level, primarily for regeneration with hydrochloric acid, were deliberately taken for the purpose of showing the effectiveness of the process of the present invention under particularly difficult and less advantageous restricted conditions.

According to the prior art method, in the majority of cases regeneration of cationic resins with hydrochloric acid is carried out at least at the regeneration level of between 80 and 100 gram HCl per liter of resin, which level often represents a compromise due to the necessity of working with resin at a heat exchange capacity and that of keeping working costs within economical limits. It is apparent that by working with resins having a higher exchange capacity or power (as indicated by the amount of salts or cations which can be taken up per unit of volume of the resin), the volume of resin used and thus also the dimensions of the installation can be reduced for a given weight of cations to be absorbed. The exchange capacity of the resin increases by increasing the amount of acid used for regeneration of the resin.

With the method of the present invention it is usually possible to raise the regenerative level to values between 300 and 500 gram HCl or even higher values per liter of resin and this will also result in a reduction of leakage to almost nil and a further reduction in the required volume of cationic resin. However, the quantity of sulfuric acid employed according to the present method will remain unchanged because the portion or amount of hydrochloric acid which is converted to salt during the regeneration will not vary and therefore the quantity of salts of the type $X^nCl_n$ in the regenerator effluent also will remain constant. In this way, and for the reasons discussed further above with respect to the monobasic reaction of sulfuric acid when in direct contact with the resin, the present method always saves at least 50% of the amount of sulfuric acid which would be required if during regeneration the resin were directly contacted by sulfuric acid.

By thus obtaining the highest possible value for the exchange capacity of the regenerated resin, under otherwise equal conditions, the total volume of resin required will be reduced. It will follow therefrom that the height of the layers of resin or of the beds can be reduced with consequent reduction of load loss in the exchange filters, or—in the case of plants in which several exchange filters are operated in series—it will be possible to eliminate one or more of the filters.

On the other hand, by maintaining the dimensions of the plant while switching to the method of the present invention, the increase in exchange capacity of the resin (the volume of which has remained unchanged) will result in an increase in the capacity of the plant per cycle, i.e., in a greater production during the interval between two successive regenerations, while at the same time the product, exemplified herein by decationized water, will be produced at costs which will be below one half of the cost of producion according to the traditional method described at the beginning of Example 1.

While the invention has been described in detail with respect to the use of two specific acids, namely hydrochloric and sulfuric acid, it has been pointed out and it is stressed that the present invention also applies to other combinations of acids some of which have been mentioned, provided that the combination of acids satisfies the conditions as set forth further above, primarily, higher volatility of the monobasic acid and greater strength of the polybasic acid.

Further examples will be described with reference to FIG. 2 of the drawing, in which A represents the raw water inlet, B the cationic filter, C the conduit for decationized water, D the anionic filter, E the conduit for demineralized water, F the container for the third fraction of outflowing regenerant, G the container for the second fraction of outflowing regenerant, H the container for the first fraction of outflowing regenerant, J the pump in the conduit leading from containers F and G to cationic filter B, and K the entire distilling device.

L denotes the inlet conduit of the stronger and less volatile acid, M the inlet conduit for sea water, and N the inlet conduit for salt-containing water.

O represents the discharge conduit for condensed steam from the distilling device K, P the inlet conduit for heating steam into distilling device K.

Conduit R is used for the first fraction of the distillation product, conduit S serves for introduction of alkaline regenerant, conduit T serves for withdrawal of alkaline regenerant, conduit U for conveying distilled and condensed solutions of the weaker and more volatile acid and conduit V a bypass for transferring distillate from distiller K to container F.

The tests which will be summarized below, were carried out in an installation according to FIG. 2 with an exchange filter B having a diameter of 1000 mm. and containing 1000 liter of cationic resin in the form of a bed having a height of 1375 mm. Exchange filter D also has a diameter of 1000 mm. and contains 1000 liters of slightly anionic resin in the form of a layer having a height of 1375 mm. The distillation apparatus K includes evaporator, condenser and heat exchanger, and had been subjected to a testing pressure of 5 atmospheres. The distillation apparatus and the pipes were made of nickel base alloys of the type known as Hastelloy B and the valves of Teflon, however, there are also other suitable materials available for this purpose. Thus, for instance, satisfactory results have been obtained with an installation made of resin coated carbon steel.

The conduit and valve arrangement according to FIG. 2 permits to carry out the regeneration in the following manner:

One-third of regenerant outflowing from B is collected in H (first fraction); ⅓ of regenerant outflowing from B is collected in G (second fraction); ⅓ of regenerant outflowing from B is collected in F (third fraction). The regenerant contained in G is transferred to H through B; the regenerant contained in F is transferred to H through B; the regenerant contained in F is returned to F through B; the regenerant contained in H is distilled and collected in F.

Sixteen tests were carried out with raw waters of three different compositions.

According to the tests or examples of group A the raw water had the following characteristics:

|  | p.p.m. $CaCO_3$ |
| --- | --- |
| Calcium | 112 |
| Magnesium | 150 |
| Sodium | 256 |
| Chlorides | 355 |
| Sulfates | 119 |
| Bicarbonates | 44 |

The raw water for the examples of group B had the following characteristics:

|  | p.p.m. $CaCO_3$ |
| --- | --- |
| Calcium | 208 |
| Magnesium | 306 |
| Sodium | 1510 |
| Chlorides | 1318 |
| Sulfates | 650 |
| Bicarbonates | 56 |

The examples of group C deal with the demineralization of raw water of the following characteristics:

|  | p.p.m. $CaCO_3$ |
| --- | --- |
| Calcium | 325 |
| Magnesium | 933 |
| Sodium | 3905 |
| Chlorides | 4321 |
| Sulfates | 758 |
| Bicarbonates | 84 |

The experimental conditions were as follows:

Experiment—
A1—prior art regeneration
A2—regenerant HCl (970% of theoretical requirements) distilled with $H_2SO_4$ at atmospheric pressure
A3—regenerant HCl (250% of theoretical requirements) distilled with $H_2SO_4$ under reduced pressure
A4—regenerant HCl (2360% of theoretical requirements) distilled with $H_2SO_4$ under reduced pressure
A5—regenerant HCl (970% of theoretical requirements) distilled with $H_3PO_4$ at atmospheric pressure
B1—traditional regeneration
B2—regenerant HCl (1030% of theoretical requirements) distilled with $H_2SO_4$ under reduced pressure
B3—regenerant HCl (270% of theoretical requirements) distilled with $H_2SO_4$ under reduced pressure
B4—regenerant HCl (2600% of theoretical requirements) distilled with $H_2SO_4$ at atmospheric pressure
B5—regenerant $CH_3COOH$ (2600% of theoretical requirements) distilled with $H_2SO_4$ under reduced pressure
C1—traditional regeneration
C2—regenerant HCl (1070% of theoretical requirements) distilled with $H_2SO_4$ and sea water under reduced pressure
C3—regenerant HCl (1070% of theoretical requirements) distilled with $H_3PO_4$ and sea water under reduced pressure
C4—regenerant HCl (2900% of theoretical requirements) distilled with $H_3PO_4$ and sea water under reduced pressure
C5—regenerant $HNO_3$ (1070% of theoretical requirements) distilled with $H_3PO_4$ under reduced pressure
C6—regenerant HCl (1180% of theoretical requirements) distilled with four times the stoichiometric quantity of $H_2SO_4$ and with sea water under reduced pressure.

The pertinent quantitative data and the results obtained according to these examples are summarized in tables II–IV.

TABLE II

Raw water, p.p.m. $CaCO_3$:
- Ca — 112
- Mg — 150
- Na — 256

Total cations — 518

- Cl — 355
- $SO_4$ — 119
- $HCO_3$ — 44

Total anions — 518

| Example No. | | $A_1$ | $A_2$ | $A_3$ | $A_4$ | $A_5$ |
|---|---|---|---|---|---|---|
| Anionic resin | Exchange capacity, grams $CaCO_3$/l | 60 | 60 | 60 | 60 | 60 |
| | Output, m.³ water | 110 | 110 | 110 | 110 | 110 |
| Cationic resin | Type of regenerant | $H_2SO_4$ | HCl | HCl | HCl | HCl |
| | Regenerative level, grams/l | 150 | 600 | 100 | 1,800 | 600 |
| | Leakage, p.p.m. $CaCO_3$ | 40 | 2 | 24 | 0 | 2 |
| | Exchange capacity, grams $CaCO_3$/l | 45.5 | 85 | 55 | 105 | 85 |
| | Output, m.³ water | 83 | 159 | 101 | 198 | 159 |
| | Q¹ | (3.5) | 9.7 | 2.5 | 23.6 | 9.7 |
| | $H_2SO_4$ consumption, kgs | 150 | | | | |
| | NaCl consumption, kgs | | 104 | 67 | 129 | |
| | Sea water consumption, m.³ | | 9.9 | 6.4 | 12.3 | 9.9 |
| | $NaNO_3$ consumption, kgs | | | | | |
| | $H_3PO_4$ consumption, kgs | | | | | |
| | $CH_3COOH$ consumption, kgs | | | | | 68.6 |
| | Wash water, l./l | 5 | 5 | 5 | 5 | 5 |
| | Distilled regenerant portion, percent | | 33 | 100 | 15 | 33 |
| | Regenerant concentration, percent | 3 | 20.3 | 24 | 22 | 20.3 |
| | Distillation temperature, °C | | 108 | 30 | 70 | 108 |
| | Distillation pressure, mm. Hg | | 760 | 20 | 152 | 760 |
| | Heat consumption, Kcal. 10³ | | 368 | 238 | 458 | 368 |
| | $H_2SO_4$ consumption, grams/m.³ $H_2O$ produced | 1,810 | | | | |
| | NaCl consumption, grams/m.³ $H_2O$ produced | | 642 | 662 | 652 | |
| | $NaNO_3$ consumption, grams/m.³ $H_2O$ produced | | 62.2 | 63.2 | 62.2 | |
| | $CH_3COONa$ consumption, grams/m.³ $H_2O$ produced | | | | | 62.2 |
| | $H_3PO_4$ consumption, grams/m.³ $H_2O$ produced | | | | | |
| | Heat consumption, Kcal/m.³ $H_2O$ produced | | 2,320 | 2,360 | 2,320 | 433 |
| | | | | | | 2,320 |

¹ Q—Gram equivalent of stoichiometric amount of volatile acid required for regeneration of cationic resin.

Table III

Raw water, p.p.m. $CaCO_3$:
- Ca — 208
- Mg — 306
- Na — 1,510

Total cations — 2,024

- Cl — 1,318
- $SO_4$ — 650
- $HCO_3$ — 56

Total anions — 2,024

| Example No. | | $B_1$ | $B_2$ | $B_3$ | $B_4$ | $B_5$ |
|---|---|---|---|---|---|---|
| Anionic resin | Exchange capacity, grams $CaCO_3$/l | 51 | 51 | 51 | 51 | 51 |
| | Output, m.³ $H_2O$ | 23.6 | 23.6 | 23.6 | 23.6 | 23.6 |
| Cationic resin | Type of regenerant | $H_2SO_4$ | HCl | HCl | HCl | $CH_3COOH$ |
| | Regenerative level, grams/l | 300 | 600 | 100 | 1,800 | 2,000 |
| | Leakage, p.p.m. $CaCO_3$ | 50 | 10 | 160 | 0 | 10 |
| | Exchange capacity, grams $CaCO_3$/l | 61 | 80 | 51 | 95 | 80 |
| | Output, m.³ $H_2O$ | 25 | 34.5 | 20 | 42 | 34.5 |
| | Q¹ | (6.2) | 10.3 | 2.7 | 26.0 | 20.6 |
| | $H_2SO_4$ consumption, kgs | 300 | | | | |
| | NaCl consumption, kgs | | 102.5 | 62 | 117 | 102.5 |
| | Sea water consumption, m.³ | | 9.7 | 5.9 | 12.0 | |
| | $NaNO_3$ consumption, kgs | | | | | |
| | $H_3PO_4$ consumption, kgs | | | | | |
| | $CH_3COOH$ consumption, kgs | | | | | |
| | Wash water, l./l | 5 | 5 | 5 | 5 | 14 |
| | Distilled regenerant portion, percent | | 33 | 100 | 15 | 5 |
| | Regenerant concentration, percent | 5 | 24 | 22 | 20.5 | 33 |
| | Distillation temperature, °C | | 30 | 70 | 108 | 50 |
| | Distillation pressure, mm. Hg | | 21 | 153 | 760 | 70 |
| | Heat consumption, Kcal 10³ | | 368 | 235 | 415 | 216 |
| | | | | | | 340 |
| | $H_2SO_4$ consumption, grams/m.³ $H_2O$ produced | 12,000 | | | | |
| | NaCl consumption, grams/m.³ $H_2O$ produced | | 2,970 | 3,100 | 2,790 | 2,970 |
| | $NaNO_3$ consumption, grams/m.³ $H_2O$ produced | | 281 | 295 | 285 | |
| | $CH_3COOH$ consumption, grams/m.³ $H_2O$ produced | | | | | |
| | $H_3PO_4$ consumption, grams/m.³ $H_2O$ produced | | | | | 400 |
| | Heat consumption, Kcal/m.³ $H_2O$ produced | | 10,700 | 11,700 | 9,900 | 9,800 |

¹ Q—Gram equivalent of stoichiometric amount of volatile acid required for regeneration of cationic resin.

Table IV

Raw water, p.p.m. CaCO₃:
- Ca _____ 325
- Mg _____ 933
- Na _____ 3,905

Total cations _____ 5,163

- Cl _____ 4,321
- SO₄ _____ 758
- HCO₃ _____ 84

Total anions _____ 5,163

| Example No. | | $C_1$ | $C_2$ | $C_3$ | $C_4$ | $C_5$ | $C_6$ |
|---|---|---|---|---|---|---|---|
| Anionic resin | Exchange capacity, grams CaCO₃/l | 45 | 45 | 45 | 45 | 45 | 45 |
|  | Output, m.³ H₂O | 8.7 | ¹ 10.2 | 10.2 | 10.2 | 8.7 | 16 |
| Cationic resin | Type of regenerant | H₂SO₄ | HCl | HCl | HCl | HNO₃ | HCl |
|  | Regenerative level, grams/l | 500 | 600 | 600 | 1,800 | 770 | 660 |
|  | Leakage, p.p.m. CaCO₃ | 50 | 25 | 25 | 0 | 25 | 20 |
|  | Exchange capacity, grams CaCO₃/l | 65 | 77 | 77 | 85 | 77 | 80 |
|  | Output, m.³ H₂O | 7.6 | 10.0 | 10.5 | 12.0 | 8 | 11 |
|  | Q ² | (12.7) | 10.7 | 10.7 | 29.0 | 10.7 | 11.8 |
|  | H₂SO₄ consumption, kgs. | 500 | 84 | | | | 336 |
|  | NaCl consumption, kgs. | | 1.7 | 1.6 | 1.6 | | |
|  | Sea water consumption, m.³ | | | | | 39.5 | 8 |
|  | NaNO₃ consumption, kgs. | | | 56.0 | 61.6 | 56.0 | |
|  | H₃PO₄ consumption, kgs. | | | | | | |
|  | CH₃COOH consumption, kgs. | | | | | | |
|  | Wash water, l./l. | 5 | 5 | 5 | 5 | 5 | 5 |
|  | Distilled regenerant portion, percent | | 33 | 33 | 33 | 33 | 33 |
|  | Regenerant concentration, percent | 6 | 24 | 24 | 24 | 25 | 24 |
|  | Distillation temperature, °C | | 30 | 30 | 30 | 50 | 30 |
|  | Distillation pressure, mm. Hg | | 20 | 20 | 20 | 76 | 20 |
|  | Heat consumption, Kcal 10³ | | 310 | 300 | 320 | 400 | 300 |
| | H₂SO₄ consumption, grams/m.³ H₂O produced | 65,800 | | | | | 30,300 |
| | NaCl consumption, grams/m.³ H₂O produced | | 8,400 | | | | |
| | NaNO₃ consumption, grams/m.³ H₂O produced | | | | | 4,950 | |
| | CH₃COOH consumption, grams/m.³ H₂O produced | | | 5,330 | 5,135 | 7,000 | |
| | H₃PO₄ consumption, grams/m.³ H₂O produced | | | | | | 27,000 |
| | Heat consumption, Kcal/m.³ H₂O produced | | 31,000 | 30,000 | 32,000 | 50,000 | |

¹ ($C_2$)—8.7+1.5=10.2.
² Q—Gram equivalent of stoichiometric amount of volatile acid required for regeneration of cationic resin.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process of regenerating cationic exchange resins, comprising the steps of treating an at least partially spent cationic exchange resin containing monovalent and bivalent cations with a solution containing a monobasic acid so as to regenerate said cationic exchange resins and to form a solution containing the salified monobasic acid; distilling the thus formed solution with a polybasic acid of greater strength and lesser volatility than said monobasic acid so as to react said polybasic acid and said salified monobasic acid, thereby freeing said monobasic acid under formation of a salt of said polybasic acid; recovering said monobasic acid; and recycling the latter for the subsequent treating of at least partially spent cationic exchange resin.

2. In a water-treatment process employing cationic exchange resins for removing cations, including monovalent and bivalent cations, from water to be treated, the steps of treating an at least partially spent cationic exchange resin containing cations removed from water with a solution containing a monobasic acid so as to regenerate said cationic exchange resin and to form a solution containing the salts of said monobasic acid and said cations; contacting the thus formed solution with a polybasic acid of greater strength and lesser volatility than said monobasic acid so as to react said polybasic acid and said salts of said monobasic acid and said cations under formation of salified polybasic acid and of free monobasic acid; and distilling off the thus formed free monobasic acid.

3. In a water-treatment process employing cationic exchange resins for removing cations, including monovalent and bivalent cations, from water to be treated, the steps of treating an at least partially spent cationic exchange resin containing cations removed from water with a solution containing a monobasic acid so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid; and to substantially volatilize the thus formed free monobasic acid; and recovering the thus volatilized monobasic acid.

4. In a water-treatment process employing cationic exchange resins for removing cations, including monovalent and bivalent cations, from water to be treated, the steps of treating an at least partially spent cationic exchange resin containing cations removed from water with a solution containing a monobasic acid so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; recovering the thus volatilized monobasic acid; and treating subsequent portions of at least partially spent cationic exchange resin with the thus recovered monobasic acid.

5. In a water-treatment process employing cationic exchange resins for removing cations, including monovalent and bivalent cations, from water to be treated, the steps of treating an at least partially spent cationic exchange resin containing cations removed from water with a solution containing a monobasic acid selected from the group consisting of hydrochloric acid, hydrobromic acid, nitric acid, nitrous acid, acetic acid and propionic acid so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; and recovering the thus volatilized monobasic acid.

6. In a water-treatment process employing cationic exchange resins for removing cations, including monovalent and bivalent cations, from water to be treated, the steps of treating an at least partially spent cationic exchange resin containing cations removed from water with a solution containing a monobasic acid so as to regenerate said cationic exchange resin and to form a solution containing the salts of said monobasic acid and said cations; contacting the thus formed solution with a polybasic acid of greater strength and lesser volatility than said monobasic acid and selected from the group consisting of sulfuric acid, pyrosulfuric acid, chromic acid, phosphoric acid and oxygenated acids and acid salts of phosphorus at a temperature at which said monobasic acid will be volatilized while said polybasic acid will remain substantially unaffected, so as to react said polybasic acid and said salts of said monobasic acid and said cations under formation of salified polybasic acid and of free monobasic acid and to substantially volatilize the thus formed free monobasic acid; and recovering the thus volatilized monobasic acid.

7. In a water-treatment process employing cationic exchange resins for removing cations, including monovalent and bivalent cations, from water to be treated, the steps of treating an at least partially spent cationic exchange resin containing cations removed from water with a solution containing a monobasic acid selected from the group consisting of hydrochloric acid, hydrobromic acid, nitric acid, nitrous acid, acetic acid and propionic acid so as to regenerate said cationic exchange resin and to form a solution containing the salts of said monobasic acid and said cations; contacting the thus formed solution with a polybasic acid of greater strength and lesser volatility than said monobasic acid and selected from the group consisting of sulfuric acid, pyrosulfuric acid, chromic acid, phosphoric acid and oxygenated acids and acid salts of phosphorus at a temperature at which said monobasic acid will be volatilized while said polybasic acid will remain substantially unaffected so as to react said polybasic acid and said salt of said monobasic acid and said cations under formation of a salified polybasic acid and of free monobasic acid and to substantially volatilize the thus formed free monobasic acid; and recovering the thus volatilized monobasic acid.

8. In a water-treatment process employing cationic exchange resins for removing cations, including monovalent and bivalent cations, from water to be treated, the steps of treating an at least partially spent cationic exchange resin containing cations removed from water with a solution containing a monobasic acid in an amount equal to between 0.5 and 500 gram equivalents of the stoichiometrically required amount for regeneration of said cationic exchange resin so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; and recovering the thus volatilized monobasic acid.

9. In a water-treatment process employing cationic exchange resins for removing cations, and including monovalent and bivalent cations, from water to be treated, the steps of treating an at least partially spent cationic exchange resin containing cations removed from water with an at least 1% aqueous solution of a monobasic acid so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; and recovering the thus volatilized monobasic acid.

10. In a water-treatment process employing cationic exchange resins for removing cations, including monovalent and bivalent cations, from water to be treated, the steps of treating an at least partially spent cationic exchange resin containing cations removed from water with a solution containing a monobasic acid so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected, said polybasic acid being applied in an amount equal to between 0.1 gram equivalents of the stoichiometric quantity thereof required for reacting with said salts of said monobasic acid and said cations and 5 gram equivalents of the stoichiometric quantity of polybasic acid corresponding to the entire amount of monobasic treating acid so as to react said polybasic acid and said salt of said monobasic acid and said cations under formation of salified polybasic acid and of free monobasic acid and to substantially volatilize the thus formed free monobasic acid; and recovering the thus volatilized monobasic acid.

11. In a water-treatment process employing cationic exchange resins for removing cations, including monovalent and bivalent cations, from water to be treated, the steps of treating an at least partially spent cationic exchange resin containing cations removed from water with an at least 1% aqueous solution of a monobasic acid in an amount equal to between 0.5 and 500 gram equivalents of the stoichiometrically required amount for regeneration of said cationic exchange resin so as to regenerate said cationic exchange resin and to form a solution containing the salts of said monobasic acid and said cations; contacting the thus formed solution with a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; and recovering the thus volatilized monobasic acid.

12. In a water-treatment process employing cationic exchange resins for removing cations, including monovalent and bivalent cations, from water to be treated, the steps of treating an at least partially spent cationic exchange resin containing cations removed from water wih at solution containing a monobasic acid so as to regenerate said cationic exchange resin and to form a solution containing the salts of said monobasic acid and said cations; contacting the thus formed solution with an at least 1% aqueous solution of a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; and recovering the thus volatilized monobasic acid.

13. A process according to claim 3 wherein said solution of a monobasic acid is an aqueous solution and the concentration of said monobasic acid therein is between 1% and the saturation point of said monobasic acid; and wherein the concentration of said polybasic acid is between a minimum concentration of 1% in an aqueous solution and a maximum concentration being equal to 5 times the total stoichiometric quantity of the monobasic acid expressed in gram equivalents.

14. A process according to claim 2 wherein at least one fraction from the distillation of the monobasic acid consisting essentially of pure water is used for washing anionic resin.

15. A process according to claim 2 wherein said partially spent cationic exchange resin is contacted with salt water; and the first fraction of the distillation is passed through an anionic bed.

16. A process according to claim 2 wherein said monobasic acid is hydrochloric acid and at least part of the required hydrochloric acid is obtained by distilling a solution of sodium chloride with sulfuric acid.

17. In a water-treatment process employing cationic exchange resins for removing cations, including monovalent and bivalent cations, from water to be treated, the steps of treating an at least partially spent cationic exchange resin containing cations removed from water with a solution containing hydrochloric acid as a monobasic acid so as to regenerate said cationic exchange resin and to form a solution containing the salts of said monobasic acid and said cations; contacting the thus formed solution with sulfuric acid as a polybasic acid of greater strength and lesser volatility than said monobasic acid at a temperature at which said monobasic acid will be volatilized while said polybasic acid will remain substantially unaffected so as to react said polybasic acid and said salts of said monobasic acid and said cations under formation of salified polybasic acid and of free monobasic acid and to substantially volatilize the thus formed free monobasic acid; and recovering the thus volatilized monobasic acid.

References Cited by the Examiner

UNITED STATES PATENTS

| | | | |
|---|---|---|---|
| 1,379,731 | 5/1921 | Theimer | 23—154 |
| 1,581,436 | 4/1926 | Galt | 23—154 |
| 2,354,172 | 7/1944 | Meyers et al. | 210—34 |
| 2,754,261 | 7/1956 | Akeroyd | 210—32 |

MORRIS O. WOLK, *Primary Examiner.*

E. G. WHITBY, *Assistant Examiner.*